Figure 1:
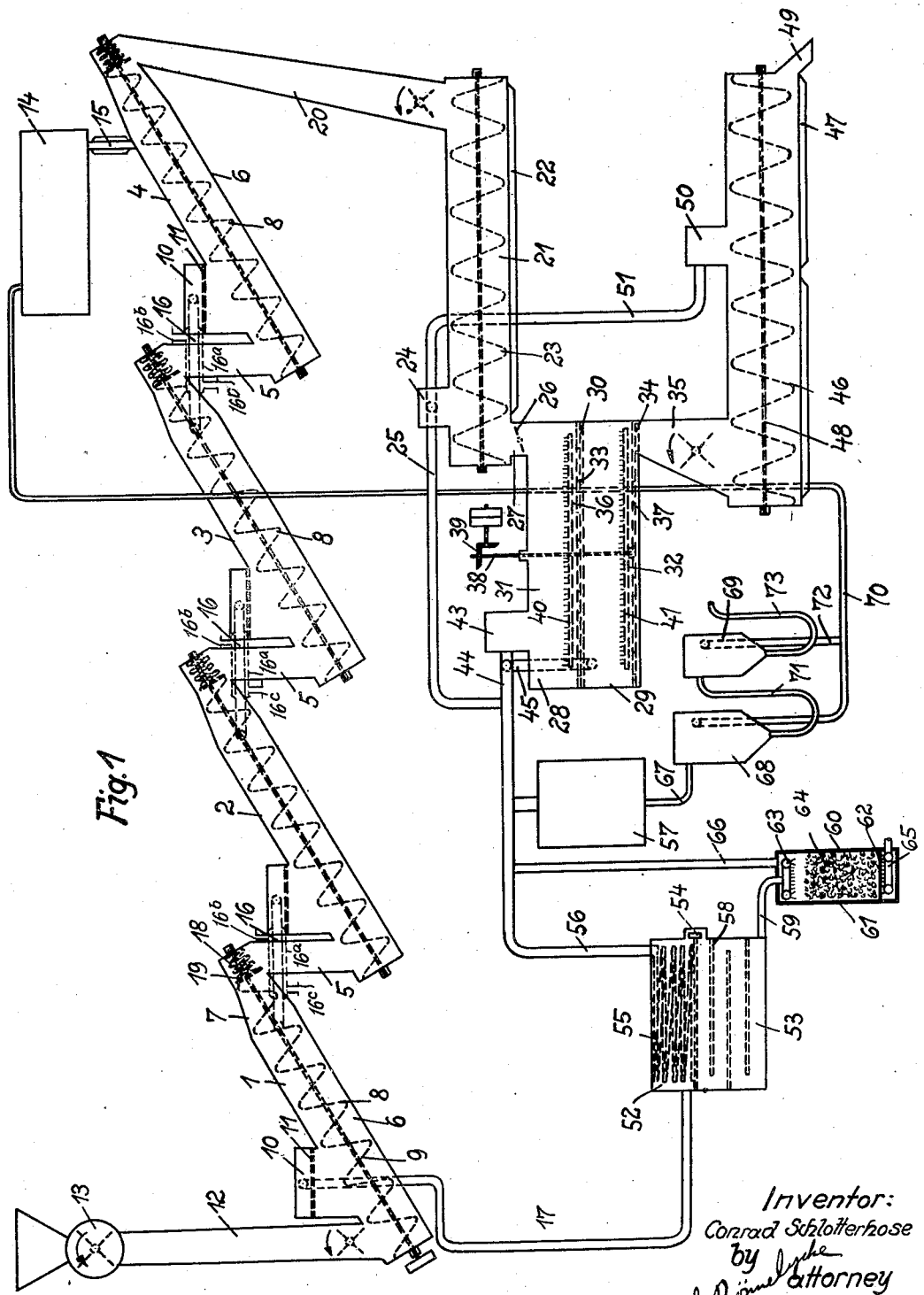

June 14, 1932.    C. SCHLOTTERHOSE    1,862,945
PROCESS OF EXTRACTION FROM SUBSTANCES CONTAINING OIL, FAT, ETC
Filed Aug. 17, 1929    2 Sheets-Sheet 1

Inventor:
Conrad Schlotterhose
by Emil Bönne, Attorney

June 14, 1932.   C. SCHLOTTERHOSE   1,862,945
PROCESS OF EXTRACTION FROM SUBSTANCES CONTAINING OIL, FAT, ETC
Filed Aug. 17, 1929    2 Sheets-Sheet 2
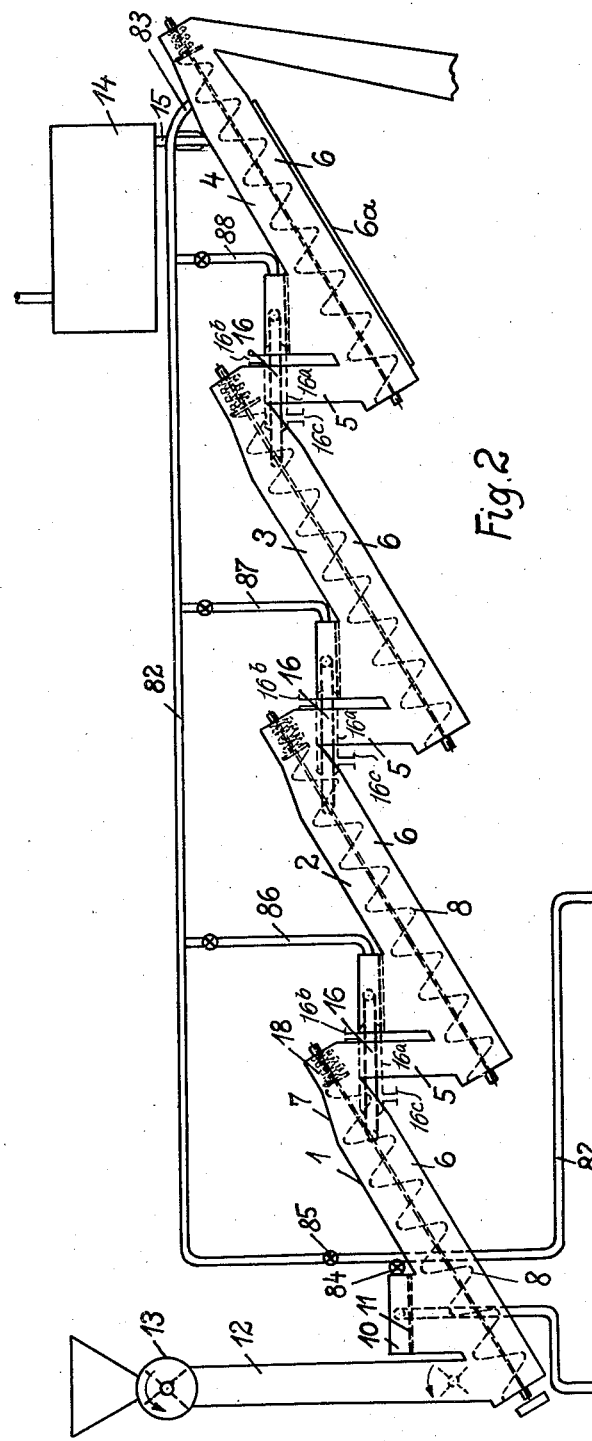
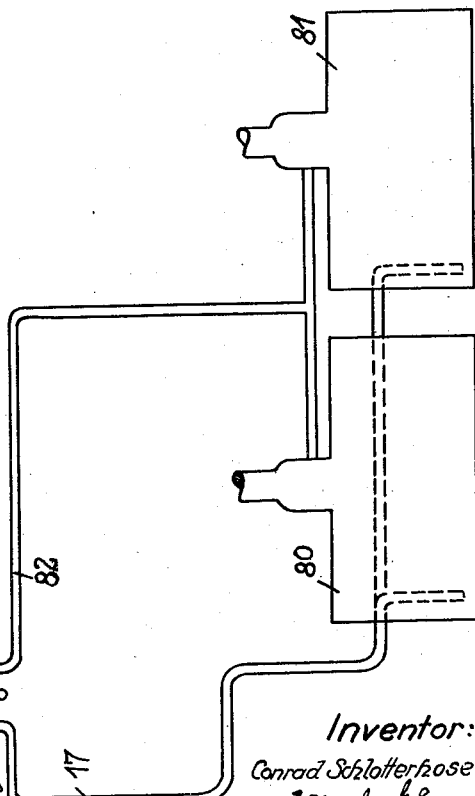
Inventor:
Conrad Schlotterhose
by Emil Binnelycke
attorney Patented June 14, 1932

1,862,945

UNITED STATES PATENT OFFICE

CONRAD SCHLOTTERHOSE, OF WESERMUNDE-WULSDORF, GERMANY

PROCESS OF EXTRACTION FROM SUBSTANCES CONTAINING OIL, FAT, ETC.

Application filed August 17, 1929, Serial No. 386,673, and in Germany August 4, 1928.

This invention relates in the first case to a process for extracting oil or fat or other extractive material from substances containing any one or several of those materials; in the second case the invention relates to an apparatus for carrying out that process, and in the third case it relates to means with the aid of which the substance submitted to the extraction process and the solvent are carried in counter-current through a plurality of extractors arranged one behind the other in battery form, all as full described hereinafter.

The main purpose of the invention is the obtaining of as far as possible the complete contents of the extractive substances sparing as much as possible the working material, and reducing the loses of solvent and consumption of steam and water. According to the invention this is attained by the material to be treated by the extraction process being passed through a number of extractors arranged is series in battery form, in which it comes into contact with the solvent supplied in counter current, so that a stepwise enrichment of the solvent and an extraction of the extractive substances takes place. The separate extractors are here preferably constructed of conical or narrowing shape at their upper ends, so that the materials subjected to extraction undergo a stronger pressure at these parts. A separate pressing device is provided at the upper ends of each of the extractors, by means of which there is exerted on the material being treated a preferably adjustable pressure, and an undesired flow of the solvent to the following extractor is prevented. In order to be able to adjust the extraction to the constitution of the goods under treatment, the arrangement is preferably so contrived that one or more extractors can be cut out of the working operation. The removal of the solvent from the material which has been treated takes place according to the invention stepwise, in such manner, that the working material is first indirectly heated in a drying apparatus, and is then subjected in a steamer to the direct action of the steam and subsequently dried in a further drying apparatus. The distillation of the solvent and extract mixture also takes place according to the invention in stages, and in such manner, that the mixture is first preheated in a preliminary heater and is then distilled in a still preferably combined with the said heater. The extract obtained in the still is preferably passed through a steamer in which the last traces of the solvent are removed. By the particular arrangement and construction of the extractors and the stepwise treatment of the working material treated and of the solvent and extract mixture, a considerable reduction of the solvent losses and a completely automatic and uninterrupted working process is obtained. The attendance on the plant is limited simply to the regulation of the speed of the various conveyor devices and to the regulation of the solvent in circulation, and to the supply of steam and water. As the material to be treated in the extractors is brought into intimate contact with the solvent, a rapid and complete extraction is obtained. Furthermore the material treated is only subjected to high temperatures in the steaming and drying apparatus for such a time as is absolutely necessary for the working object in view, so that the feeding value of the material remains unimpaired, and for example with seeds an excellent extraction meal of light colour is obtained. In consequence of the continuous distillation of the extract the working temperatures in the still do not need to be higher than is absolutely necessary for the separation of the extract from the solvent, while the duration of the action can be reduced to a minimum. In this way an extract is obtained which is at least equal to those obtained under like conditions by means of pressing, both as regards the contents in free fat acid as also in respect of the colour.

As the solvent is always in circulation the cubic contents of the separate apparatus only need to be small, so that a comparatively small amount of solvent suffices. By means of the uninterrupted distillation a uniform consumption of steam in the stills is ensured and variations in the steam consumption, such as obtain in distillation in lots, is avoided. A reduction in the steam consumption can also be attained by the solvent vapours produced in the distillation being utilized for the direct preheating of the solvent and extract mixture.

The solvent vapour produced in the still and in the other apparatus are preferably condensed in a condenser having several cooling systems. As the quantity of vapour to be condensed is, in consequence of the uninterrupted working process, almost always the same, the quantity of water required for the condenser is comparatively small and is not subject to appreciable variations. The condenser therefore only requires to be calculated for a definite uniform output and can therefore be made comparatively small. Finally, owing to the continuous working process a uniform power consumption of the separate apparatus is attained, so that only a compartively small driving machine need be provided for the whole installation.

While the preceding parts of this specification relate to the first and the second part of the present invention, as referred to in the paragraph immediately after the preamble, the following part of this specification relates to the third part, also as referred to in said paragraph. In this part of the invention the substance to be submitted to the extraction process and the solvent are carried in counter current through a number of extractors arranged one behind the other in battery form. The treatment of the material takes place in a number of containers connected in series in which the material to be treated moves in an ascending path and is plunged within the separate containers alternately in the extraction liquid, being saturated with this and finally pressed out.

This part of the invention is a further development of the first and the second part; it has for its object to free the material rising from the dipping bath and which is still intermingled with the extraction solvent mixture, from this and at the same time to disintegrate it so that it can be pressed out in the following pressing process without it being necesary to use a very heavy pressure, prejudicial to the goods being pressed. For this purpose, in place of the above-mentioned extractors where a sprinkling of the material subjected to extraction takes place with the extraction liquid, besides or instead of this sprinkling the material is subjected to a treatment with vapours of the solvent. To attain this, the containers or at least the last one in the direction in which the material is carried, are provided with an apparatus for the production of the solvent in vapour form, or the solvent is supplied in a gaseous form to the separate containers or some of them, by a still outlet nozzle for the solvent extracting solution.

The apparatus for carrying out the processes are illustrated diagrammatically and by way of example on the accompanying drawings, on which Fig. 1 relates to the first and the second part of the invention and Fig. 2 to the third part thereof.

The details are as follows:

1, 2, 3 and 4 (Fig. 1) are four extractors arranged in series in an inclined position, and connected together by the pipes 5. Each extractor consists of an essentially cylindrical vessel 6 the upper part 7 of which, attached to the connecting pipe 5 leading to the next extractor, is formed in cone shape. A conveyor worm 8 is arranged in the vessel 6, 7, the axle of which is kept in constant rotation in any desired manner. On the vessel 6 is fitted a filter chamber 10 in the vicinity of its lower end, which is closed underneath by a preferably removable filter or sieve 11. The lower end of the first extractor 1 is connected with a feed hopper 12 or the like, closed at the top by a gate valve and through which the working material to be treated is fed and reaches the lower part of the extractor 1. From here the working material is fed upwards by the rotating conveyor worm 8 and passes then through the connecting pipe 5 into the next adjacent extractor. During the feed through the stepwise arranged extractors, the material being treated is brought into contact with a suitable solvent, chlorine derivatives, ethyl dichloride, ethyl trichloride, bisulphide of carbon, carbon tetrachloride, methyl chloride, etc., the solvent being carried uninterruptedly in counter current through all the extractors one after the other. To this end, a solvent container 14 is arranged in the vicinity of the last extractor 4 and is connected by means of a pipe 15 with the upper part of the vessel 6. The solvent which reaches the extractor 4 through the pipe 15 comes into intimate contact in the vessel 6 with the working material forced upwards by the conveyor worm 8 and which has already been fully lixiviated by the treatment in the extractors 1, 2 and 3, dissolving in its passage through the working material the residue of the extractive substances still left in the working material and passes then through the filter or the sieve 11 into the filter chamber 10. From here the weakly saturated solution is carried through a connecting pipe 16 into the upper part of the extractor 3 in which it again penetrates through the working material forced upwards by means of the conveyor worm of this extractor. The enriched solution then passes in the same way as with the extractor 4 through a connecting pipe 16 into the extractor 2, in which a further enrichment takes place. From the extractor 2 the more strongly saturated solution passes finally through the pipe 16 into the extractor 1 and comes therein into contact with the fresh working material supplied through the feed hopper 12. The saturated solution then passes through the filter 11 which retains any solid particles which may have been taken up, into the filter chamber 10 of the extractor 1, and is drawn off from here through the outlet pipe 17. In order to prevent the passage of solvent vapours through the inlet hopper 12, this is preferably filled with working material, so that even when the gate valve 13 is open, no solvent vapour can pass out. At the conically shaped upper end 7 of each extractor there is suitably arranged a pressure plate 19 which is under the action of a spring 18 and the object of which is to exert a slight pressure on the working material saturated by the solvent, in order to thereby retain the superfluous moisture. By means of the conical formation of the part 7, the further advantage is obtained that the working material is more tightly pressed together in the said part and to a certain extent forms a plug which prevents the outlet of the solvent at this point.

The extraction process may be regulated in the simplest manner by the adjustment of the speed of feed of the working material and of the solvent, and by a corresponding adjustment of the speed of rotation of the conveyor worms. The solvent may, if necessary, be warmed or heated by the insertion of preheaters 16a having the form of jackets surrounding the connecting pipes 16 and being provided with an inlet 16b and an outlet 16c for the heating steam and the condensed water, respectively.

In order to permit of the extraction process being suited to the constitution of the material subjected to treatment, by-pass conduits, not shown on the drawings, are so arranged on the extractors that one or more extractor or extractors may be disconnected. The working material leaving the last extractor 4 has been subjected to full extraction; it shows, however, in consequence of the absorption of constituent parts of the solvent, a high degree of moisture and must therefore be freed from these constituents. For this purpose, the treated working material is carried through a pipe 20 first into a drying apparatus 21, which consists essentially of a double wall cylindrical vessel 22, in which a stirring device 23 is arranged. Steam is carried through the jacket 22 of the drying device 21. The moist treated material entering the drying apparatus at one end, is kept by means of the stirring device 23 in constant contact with the heated jacket surface, and at the same time is carried forward towards the other end of the apparatus. The solvent vapours produced by the drying are carried away through a pipe 25 connected to a dome-shaped addition 24 to the vessel 22.

The preliminary dried working material from the dryer 21 still contains small residues of the solvent which, as has been shown, cannot be removed other than by the direct action of steam. To this end, the working material coming from the drying apparatus 21, is carried through a connecting piece 27 preferably provided with a closing flap 26 into a steamer 28. The steamer 28 consists essentially of a vessel 29 which is sub-divided by a fixed partition 30 in the vertical position, into two spaces 31 and 32. The partition 30 is provided with an opening 33, and an opening 34 is provided in the bottom of the vessel 29 to which is connected a drop hopper 35. On the partition 30 and the bottom of the vessel 29 rest plates 36 and 37 provided with perforations, which by means of an operating device not shown can be moved from the outside. In the chamber is furthermore carried a vertical shaft 38 which, by means of a bevel wheel gear 39, may be put in rotation by any desired drive. On the axle 38, above the plates 36 and 37 are fixed stirring arms 40 and 41, which are made in the form of tubes and have a number of openings from which streams of steam flow out. The supply of the steam preferably takes place by means of the axle 38 which in this case is made hollow.

The method of working of the steamer is as follows:

By the opening of the flap 26 a certain quantity of the working material preliminarily dried in the drying apparatus 21 is filled into the space 31. The plate 36 is here so adjusted that the part cut away therein does not coincide with the opening 33 of the partition 30, so that the space 31 is entirely closed at the bottom. As soon as a sufficient quantity of the working material is supplied into the space 31, the flap 26 is closed. The working material is then stirred in the space 31 by means of the arms 40 which have been put in rotation, the residue of solvent still remaining in the working material being thus evaporated under the action of the streams of steam issuing from the stirring arms 40. The vapours are carried away through a pipe 44 connected to a dome shaped addition to the vessel 29.

After a time the plate 36 is moved into a position in which its cut-away part coincides with the opening 33 of the partition 30. The working material then in the space 31 falls down into the space 32, in which it is again stirred up and steamed. The bottom opening 34 of the vessel 29 closed on the filling of the space 32 by the plate 37 provided with a cut-away part in the same manner as the plate 36, is then opened by the movement of the plate 37, so that the working material freed in the space 32 from the last traces of the solvent, can fall into the outlet hopper 35. The vapours produced in the space 32 are carried away through a pipe 45.

As the working material by means of its treatment in the steamer 28 takes up a certain amount of moisture it has been shown as advisable to subject the working material coming from the steamer, to a supplementary drying. This supplementary drying, in the form of construction shown, takes place in a drying apparatus 46 which is constructed in the usual form of a trough dryer and is provided with a steam jacket 47. The working material fed by the drop hopper 35 is brought by means of stirrers or blades 48 in the drying apparatus 46 into intimate contact with the heating surfaces and at the same time conveyed towards the upper end of the apparatus where it leaves this apparatus through a spout 49. The vapours created by the drying are carried into a chamber provided on the upper side of the drying apparatus and to a pipe 51 connected thereto.

The pipe 17 connects to the filter chamber 10 of the first extractor 1 and through which the solvent and extract mixture is continuously carried away, is taken to a distillation apparatus consisting of a preheater 52 and the actual still 53. The preheater 52 is arranged above the still 53 and is connected thereto by a pipe 54. A pipe system 55 is arranged in the preheater 52 and through this flows the solvent and extract mixture carried through the pipe 17. The outer surfaces of the pipes 55 are swept by the solvent vapours rising out of the still 53 and which reach the preheater through a connecting pipe not shown, so that the solution flowing through the pipes is preheated. As a part of their heat is abstracted from the solvent vapours by means of the pipes 55 and the solvent and extracted mixture carried therethrough, a partial condensation of the vapours can take place in the preheater 52. The condensate thereby produced can be carried away through a liquid trap overflow not shown and be carried to the separator more fully described below. The solvent vapours not condensed are carried by a pipe 56 into a condenser 57 which contains in known manner a number of cooling systems. The condenser 57 is connected, furthermore, with the vapour outlets 25 and 51 of the drying apparatus 21 and 46 and the vapour outlet 44 and 45 of the steamer 29, each of the said pipes preferably leading to a separate cooling system of the condenser. In the drawings, for the sake of clearness, the vapour pipes are combined together.

The still situated underneath the preheater 52 consists essentially of a number of heating plates 58 arranged in cascade form over which is carried in a wide stream the solvent and extract mixture previously preliminarily heated in the preheater 52, the solvent being thus evaporated. The vapours here produced are, as already mentioned, carried into the preheater 55 and here utilized for the preliminary heating of the solvent extract mixture. The extract remaining after the evaporation is carried by means of a pipe 59 to a separate steamer 60 in which any last remaining traces of the solvent in the extract are removed. The steamer 60 consists in the form of construction shown, of a cylindrical container 61 in the bottom part of which is inserted a sieve bottom 62 on which rests a suitable layer of material; at the end of the pipe 59 leading into the upper part of the container 61 is arranged a distributor 63 out of which the extract flows and spreads over the layer 64. Below the sieve bottom 62 is provided a steam supply pipe 65 preferably of ring shape out of which the steam flows through the openings provided on the upper side, and flows through the layer of material 64. The steam here comes into contact with the finely divided extract in the layer 64, so that the solvent residue is evaporated out of this. After the passage through the layer 64, the vapour is carried through a pipe 66 connected to the upper side of the container 61, to the condenser 57. The extract trickling downwards through the layer 64 collects in the lower part of the container 61 and is carried away in any suitable manner.

The condenser 57 can be constructed in any suitable manner, it may, for example, consist of separate sets of tubes which are expanded into wrought iron plates at the ends of which there are cast iron closing chambers. The vapours entering the condenser 57 are condensed in the separate cooling system and the condensate flowing off and which consists of a mixture of the solvent and water, is carried through a pipe 67 to two separators 68 and 69 working automatically and arranged one behind the other. The separators work in the manner of Florentine flasks and effect a complete separation of the solvent from the water. The solvent separated out of the liquid mixture in the separator 68 serving as preliminary separator, passes into a pipe 70 which is in connection with the solvent container 14 arranged in the vicinity of the extractor 4. The water almost completely separated from the solvent in the separator 68, is carried through a connecting pipe 71 into the separator 69 in which the residue of the solvent is separated out and carried through a pipe 72 to the collecting pipe 70. The water remaining in the separator 69 is led off through a pipe 73.

The advantage attained by the invention consists, as already mentioned at the outset, principally in that the working material to be subjected to extraction is treated in an uninterrupted working cycle with the greatest possible sparing of the material and avoiding excessive heating, and furthermore in that the solvent losses in consequence of the circulation and of the special treatment of the solvent are reduced to a minimum.

Referring now to Fig. 2, there are also in this constructional form of the apparatus 1, 2, 3 and 4 the containers or extractors which are arranged in series at an inclination, and which by means of outlet pipes 5 are connected with each other. The separate containers consist essentially of cylindrical casings 6, the upper parts 7 of which are made of conical shape. In the separate containers or extractors, a conveyor apparatus 8 is provided, the axle 9 of which is kept on continuous rotation. At the lower end of each extractor is fitted on the housing a draw-off trap 10 or a filter chamber. The extraction medium solution is taken from this chamber. Underneath the draw-off pipe is provided a preferably removable filter, sieve, or the like. The feed of the material to be treated takes place through a feed hopper 12 closed by a valve 13. The solvent is carried in counter current out of the solvent container 14 through the pipe 15. It trickles first into the upper part of one of the containers over the goods to be treated and fills the dipping chamber provided at the lower end of each of the containers and flows then through the pipe 16 into the next container. The goods being treated are carried by the conveyor apparatus 8 through the separate containers and the pipes 5 arranged between them, while the solvent moves in counter current thereto.

According to the invention, the separate extractors or containers 6, at least the last of these containers into which the material to be treated first flows, are provided with a steam jacket 6a, so that the material to be used for the extraction which passes out of the container 14 into the extractor 4 is at least partly evaporated and, in the centre part, first of the upper extractor, a spraying takes place with liquid and at the same time with the gaseous solvent. The gaseous solvent can then pass through the sieve 11 and flow into the next extractor, where it again, either alone or together with liquid solvent flowing out of the pipe 16, sprinkles over or flows through the material being treated and then continues on its way in the same manner. By the passage of the solvent vapour through the filter this latter is also cleaned. The solvent, enriched with fat, then passes on to the outlet pipe 17.

In order to prevent the passage of the solvent vapour through the supply pipe 12, this latter is preferably kept filled with working materials so that even when the valve 13 is open, no solvent vapour can pass out.

The solvent vapours may also, and this is the best method, be taken from the distillation apparatus for the extraction solvent mixture. As already mentioned, the mixture flows through the pipe 17 into the two distilling apparatus 80 and 81. The solvent vapours produced by the distillation process are carried to the extractors by a pipe 82. The solvent vapours may also be allowed to work in direct current. In this case, they enter as shown on the drawing, through the pipe 82 into the chamber 10 of the lowest extractor 1, passing thence through the sieve 11 into the extractor and flowing through the next extractor, although a counter current flow could, of course, be here attained also, as takes place with the vapours produced in the extractor 4 by heating, by extending the pipe 82 and letting it enter above at 83 into the extractor 4. In order to be able to use the apparatus as desired in either manner, a valve device 84, 85 is inserted in the pipe so that on opening 84 and closing 85 the gas is led in direct current and with reverse connections, in counter current. Finally, by means of branch pipes 86, 87 and 88 arranged, preferably with valves therein, on the pipe 82, the gases may be carried as required to the separate containers or extractors 1 to 3.

The regulation of the extraction process takes place by the adjustment of the speed of feed of the working material and by adjusting the speed of the conveying and pressing devices.

The distilling apparatus for the extraction medium mixture are preferably used, as shown on the drawing, for the production of the vapours. Of course any other desired apparatus may be used for the production of these solvent gases or vapours.

I wish it to be understood that I do not limit myself to the details of the apparatus which have been shown merely as examples. In the details many departures are possible without departing from the gist and essence of the invention.

I claim:—
1. An extractive process for oil and fat bearing materials with the aid of suitable solvents comprising conveying the material to be treated and the solvent in counter-current through a number of extractors thereby moving the material to be treated in each extractor in an upward directed path and alternately dipping it in the extracting fluid, trickling it with said fluid, and then pressing it out and removing the solvent and extract mixture out of the lower part of the first extractor.

2. An extractive process for oil and fat bearing materials according to claim 1, in which after the dipping of the material submitted to the extraction process, a treatment of the material with a gaseous solvent medium in the center part of the extractors takes place, said gaseous solvent being supplied in counter-current.

3. An extractive process for oil and fat bearing materials according to claim 1, in which, after the dipping of the material submitted to the extraction process, a treatment of the material with a gaseous solvent medium in the center part of the extractors takes place, said gaseous solvent being supplied in counter-current, and in which the solvent and extract mixture is distilled, the distilled solvent medium being used for the said treatment of the material with gaseous solvent.

4. An extractive process for oil and fat bearing materials with the aid of suitable solvents comprising carrying the material to be subjected to extraction and the solvent in counter-current through a number of extractors, moving the material to be treated in each extractor in an upward directed path and alternately dipping it in the extracting fluid, trickling it with said fluid and then pressing it out and removing the solvent and extract mixture out of the lower part of the first extractor, carrying the material in an uninterrupted working process through an evaporating apparatus, warming it by indirect steam action, and then freeing it by direct action of steam from the solvent residue.

In testimony whereof I affix my signature.

CONRAD SCHLOTTERHOSE.